US011938936B2

(12) United States Patent
Maniwa et al.

(10) Patent No.: US 11,938,936 B2
(45) Date of Patent: Mar. 26, 2024

(54) STAND-UP VEHICLE HAVING SAFETY POSTURE DETERMINATION PROCESS AND UPPER LIMIT SPEED MANAGEMENT PROCESS

(71) Applicant: TOYOTA JIDOSHA KABUSHIKI KAISHA, Toyota Aichi-ken (JP)

(72) Inventors: Yuta Maniwa, Susono (JP); Tetsuya Kanata, Susono (JP); Yozo Iwami, Susono (JP); Daisaku Honda, Nagoya (JP); Yuhei Katsumata, Fuji (JP); Hideki Fukudome, Toyota (JP); Takuya Watabe, Hachioji (JP); Naoko Ichikawa, Tokyo-to (JP); Saki Narita, Susono (JP); Yuki Nishikawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1 day.

(21) Appl. No.: 17/464,095

(22) Filed: Sep. 1, 2021

(65) Prior Publication Data

US 2022/0063619 A1    Mar. 3, 2022

(30) Foreign Application Priority Data

Sep. 3, 2020    (JP) .................................. 2020-148376

(51) Int. Cl.
  *B60W 30/14*    (2006.01)
  *B60W 50/00*    (2006.01)
  (Continued)

(52) U.S. Cl.
  CPC ...... *B60W 30/146* (2013.01); *B60W 50/0098* (2013.01); *B60W 50/085* (2013.01);
  (Continued)

(58) Field of Classification Search
  CPC .......... B60W 30/146; B60W 60/0016; B60W 2540/21; B60W 2540/223; B60W 50/0098; B60W 50/085
  See application file for complete search history.

(56) References Cited

U.S. PATENT DOCUMENTS 8,740,240 B1 *    6/2014  Merel ..................... A61G 5/046
                                                             482/69
10,074,281 B2    9/2018  Pandita et al.
                  (Continued)

FOREIGN PATENT DOCUMENTS

JP    2012020796        *  7/2010  ............. B66B 31/00
JP    2017-185946 A      10/2017
JP    2020-003936 A      1/2020

OTHER PUBLICATIONS

Machine Translation for JP2012020796A (Year: 2010).*

*Primary Examiner* — Jess Whittington
*Assistant Examiner* — Rami Nabih Bedewi
(74) *Attorney, Agent, or Firm* — Dinsmore & Shohl LLP

(57) ABSTRACT

In a stand-up vehicle having a vehicle upper part having a riding surface configured for a user to stand on, one or more electronic control units execute emergency situation detection processing for detecting an emergency of the user when receiving notification from the user or based on information from one or more sensors, safety posture determination processing for determining whether or not the user takes a safety posture based on information from one or more sensors after detecting the emergency, and upper limit speed management processing executed when detecting the emergency and determining that the user takes the safety posture. The upper limit speed management process increases the upper limit speed to be higher than the basic upper limit speed selected when the safety posture determination pro- (Continued)

cess determines that the user is not in the safety posture, or cancels the upper limit speed.

9 Claims, 11 Drawing Sheets

(51) Int. Cl.
  *B60W 50/08* (2020.01)
  *B60W 60/00* (2020.01)
  *G06K 9/00* (2022.01)
  *G06V 20/59* (2022.01)
  *G06V 40/20* (2022.01)

(52) U.S. Cl.
  CPC ......... *B60W 60/0016* (2020.02); *G06V 20/59* (2022.01); *G06V 40/20* (2022.01); *B60W 2540/21* (2020.02); *B60W 2540/223* (2020.02)

(56) References Cited

U.S. PATENT DOCUMENTS

| | | |
|---|---|---|
| 10,515,278 B2 | 12/2019 | Ide |
| 10,692,369 B2 | 6/2020 | Endo |
| 10,814,880 B2 | 10/2020 | Kishi |
| 10,864,852 B2 | 12/2020 | Morimura et al. |
| 10,957,188 B2 | 3/2021 | Johnson et al. |
| 10,974,732 B2 | 4/2021 | Madimerou |
| 11,205,342 B2 | 12/2021 | Ikemoto et al. |
| 11,231,285 B2 | 1/2022 | Hokai et al. |
| 11,270,136 B2 | 3/2022 | Yanagi et al. |
| 2006/0001545 A1* | 1/2006 | Wolf ................. G08B 21/0446 340/686.1 |
| 2014/0276238 A1 | 9/2014 | Osorio |
| 2017/0027803 A1* | 2/2017 | Agrawal .............. A61B 5/1122 |
| 2017/0172465 A1* | 6/2017 | Osorio ................. A61B 5/0205 |
| 2017/0293299 A1 | 10/2017 | Matsushita et al. |
| 2019/0359227 A1 | 11/2019 | Otaki et al. |
| 2020/0172114 A1 | 6/2020 | Hamagami et al. |
| 2021/0107421 A1* | 4/2021 | Uno ..................... B60W 40/08 |

* cited by examiner

STAND-UP VEHICLE HAVING SAFETY POSTURE DETERMINATION PROCESS AND UPPER LIMIT SPEED MANAGEMENT PROCESS

CROSS-REFERENCE TO RELATED APPLICATIONS

This application claims priority to Japanese Patent Application No. 2020-148376 filed on Sep. 3, 2020, the entire contents of which are herein incorporated by reference.

BACKGROUND

Technical Field

The present disclosure relates to a stand-up vehicle having a vehicle upper portion on which a user stands.

Background Art

JP 2017 185946 A discloses an autonomous driving system for a vehicle. In this autonomous driving system, when it is determined that the driver of the vehicle is in an emergency state based on the driver information, autonomous driving based on the emergency assistance package is executed.

JP 2017 185946 A describes, as a specific example of the emergency driving assistance package, that execution of lane following control and automatic stop control is permitted as a driving operation related to a driving assistance function. Further, it is described that execution of hazard lamp lighting control is permitted as a driving operation related to the congestion support function.

SUMMARY

In stand-up vehicles, an upper speed limit is provided for user safety. On the other hand, while the user is in the vehicle, there is a possibility that an emergency situation such as a bad physical condition of the user or a crime may occur. In such an emergency situation, it is conceivable to configure the stand-up vehicle so as to increase or cancel the upper limit speed. However, the increase or cancellation of the upper limit speed is required to be performed while ensuring the safety of the user.

The present disclosure has been made in view of the above-described problems, and an object of the present disclosure is to provide a stand-up vehicle capable of increasing or canceling an upper limit speed while securing safety of a user in an emergency.

A stand-up vehicle according to the present disclosure includes a vehicle upper portion, a handrail, one or more sensors, a power unit, and one or more electronic control units. The vehicle upper portion has a riding surface configured for a user to stand on. The handrail is provided at an upper portion of the vehicle, and the handrail is configured for a user to grip. The one or more sensors detect a movement of a user riding the stand-up vehicle. The power unit drives the stand-up vehicle. The one or more electronic control units control the power unit to limit a speed of the stand-up vehicle to an upper limit speed or less. The one or more electronic control units execute an emergency detection process, a safety posture determination process, and an upper limit speed management process. The emergency detection process detects an emergency of the user when receiving a notification from the user or based on information from the one or more sensors. The safety posture determination process determines whether or not the user is in a safety posture based on the information from the one or more sensors after the emergency is detected by the emergency detection process. The upper limit speed management process is executed when an emergency is detected by the emergency detection process and the user is determined to be in the safety posture by the safety posture determination process. The upper limit speed management process is a process of increasing the upper limit speed to be higher than the basic upper limit speed selected when the safety posture determination process determines that the user is not in the safety posture, or a process of canceling the upper limit speed.

The stand-up vehicle may further comprise a microphone. The one or more electronic control units may detect the emergency when a predetermined password corresponding to the notification from the user is detected by the microphone.

The safety posture may include a posture in which the user stands on all fours on the riding surface.

The safety posture may include a posture in which the user squats on the riding surface while gripping the handrail.

The safety posture may include a first posture in which the user holds the handrail while standing on the riding surface and a second posture in which the user stands on all fours on the riding surface. In the upper limit speed management process, when the safety posture determined by the safety posture determination process is the second posture, the one or more electronic control units may increase an increase amount of the upper limit speed with respect to the basic upper limit speed, compared to a case where the safety posture is the first posture.

The safety posture may include a first posture in which the user holds the handrail while standing on the riding surface and a third posture in which the user squats while holding the handrail on the riding surface. In the upper limit speed management process, when the safety posture determined by the safety posture determination process is the third posture, the one or more electronic control units increase an increase amount of the upper limit speed with respect to the basic upper limit speed, compared to a case where the safety posture is the first posture.

According to the present disclosure, when the emergency is detected by the emergency detection process and it is determined that the user is in the safety posture by the safety posture determination process, the process of increasing the upper limit speed above the basic upper limit speed or the process of canceling the upper limit speed is executed. In this way, the increase or cancelation of the upper limit speed in the present disclosure is performed not only in response to the detection of the emergency but also on the additional condition that the user is in the safety posture. Therefore, it is possible to provide a stand-up vehicle capable of increasing or canceling the upper limit speed while securing the safety of the user in an emergency.

DETAILED DESCRIPTION

In each of the embodiments described below, elements common to each of the drawings are denoted by the same reference description thereof will be omitted or simplified. In addition, in the following embodiments, when the number, quantity, amount, range, or the like of each element is mentioned, the present disclosure is not limited to the mentioned number unless otherwise specified or unless clearly specified in principle.

1. First Embodiment 1-1. Configuration Example of Stand-Up Vehicle (Vehicle for Moving People)

Figure 1:
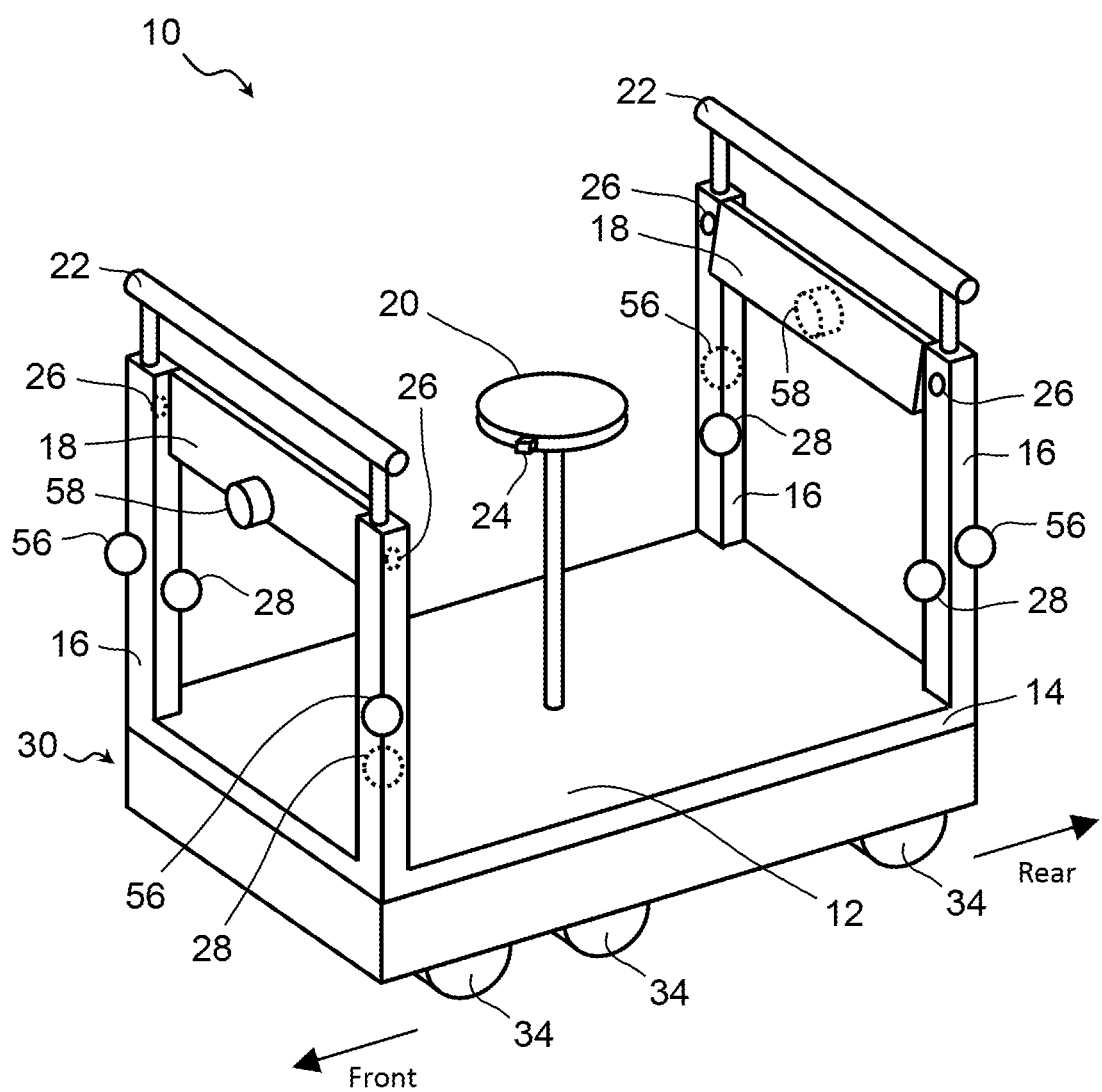
FIG. 1 is a perspective view of a stand-up vehicle according to a first embodiment.
Figure 2:
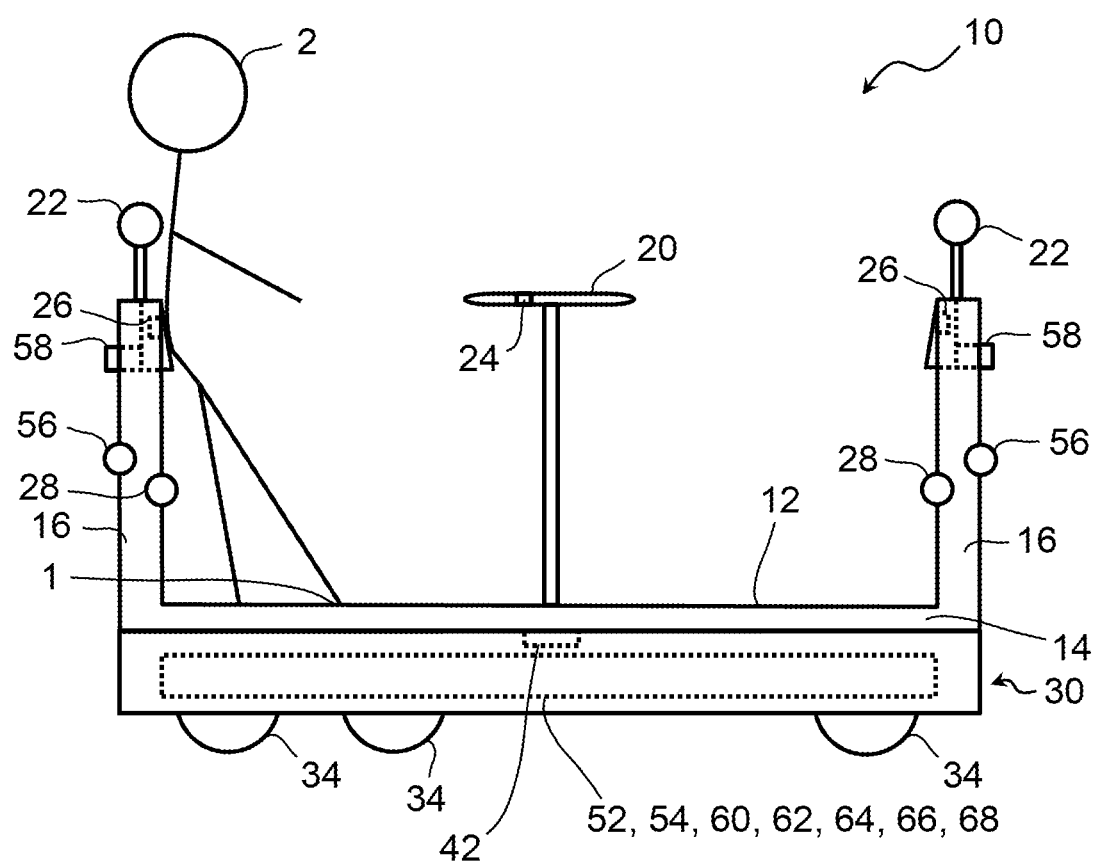
FIG. 2 is a side view of the stand-up vehicle shown in FIG. 1.
Figure 3:
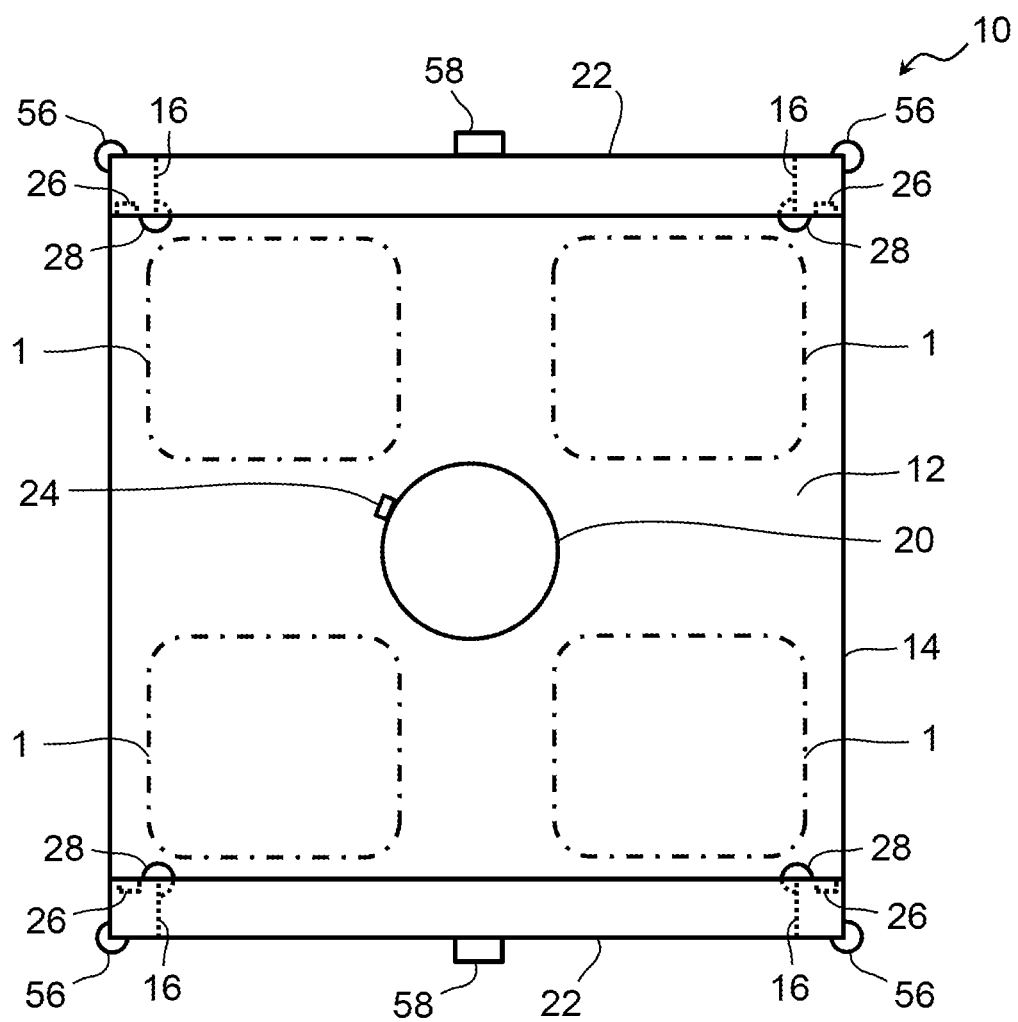
FIG. 3 is a plan view of the stand-up vehicle shown in FIG. 1.

FIG. 1 is a perspective view of a stand-up vehicle 10 according to the first embodiment. FIGS. 2 and 3 are a side view and a plan view, respectively, of the stand-up vehicle 10 shown in FIG. 1.

The stand-up vehicle 10 (hereinafter, simply referred to as a "vehicle 10") includes a top plate 14 having a riding surface (deck) 12 on which a user stands. The top plate 14 constitutes an upper portion of the stand-up vehicle 10, which corresponds to an example of the "vehicle upper portion" according to the present disclosure. The riding surface 12 is an upper surface of the top plate 14. The stand-up vehicle 10 is a type of autonomous traveling vehicle capable of unmanned driving. More specifically, the standing-ride type vehicle 10 carries people on the top plate 14. The riding capacity of the vehicle 10 is not particularly limited, but the riding capacity of the vehicle 10 of the first embodiment is, for example, four persons as shown as an assumed riding position 1 in FIG. 3. That is, the vehicle 10 is a small stand-up vehicle (cart). The vehicle 10 may have a function of traveling by an operation of a user or a driver instead of a vehicle dedicated to autonomous traveling described below.

In the vehicle 10, the configuration of the riding space positioned on the riding surface 12 of the top plate 14 can be freely selected. FIGS. 1 to 3 illustrate an example of the configuration. A support 16 is provided at each of the four corners of the riding surface 12. Each support 16 stands upright from the riding surface 12. The support 16 may be formed integrally with the top plate 14 or may be formed separately from the top plate 14.

The vehicle 10 is provided with a backrest 18 at both its front and rear ends. The backrest 18 is formed so as to connect the tips of the two supports 16 at each of the front end portion and the rear end portion of the vehicle 10. As illustrated in FIG. 2, a user 2 of the vehicle 10 can also stand while leaning against the backrest 18 during riding. A table 20 convenient for the user is attached to the center of the riding surface 12.

The vehicle 10 is also provided with a handrail 22 at both its front and rear ends. These handrails 22 are provided to be grasped by a user such as the user 2 during riding. As an example, the handrail 22 is formed above the backrest 18 so as to bridge the tips of the two supports 16 at each of the front end portion and the rear end portion.

The vehicle 10 includes a microphone 24, an emergency button 26, and an inward facing camera 28. The microphone 24 is installed, for example, on the table 20 in order to pick up sound in the riding space of the vehicle 10. The emergency button 26 is pressed by the user in an emergency, and is provided on each of the four support 16, for example. The inward facing camera 28 is installed on each of the four supports 16, for example, and faces in a direction in which an image of the riding space can be captured. The microphone 24, the emergency button 26, and the inward facing camera 28 are connected to an autonomous travel electronic control unit (ECU) 64 described later, and are used in "upper limit speed management in emergency" described later.

Further, the vehicle 10 is provided with a chassis unit 30 relating to a traveling function together with the top plate 14. The top plate 14 is, for example, a separate body from the upper surface of the chassis unit 30, and is mounted on the chassis unit 30. Alternatively, the top plate 14 may constitute the upper surface of the chassis unit 30.

Figure 4:
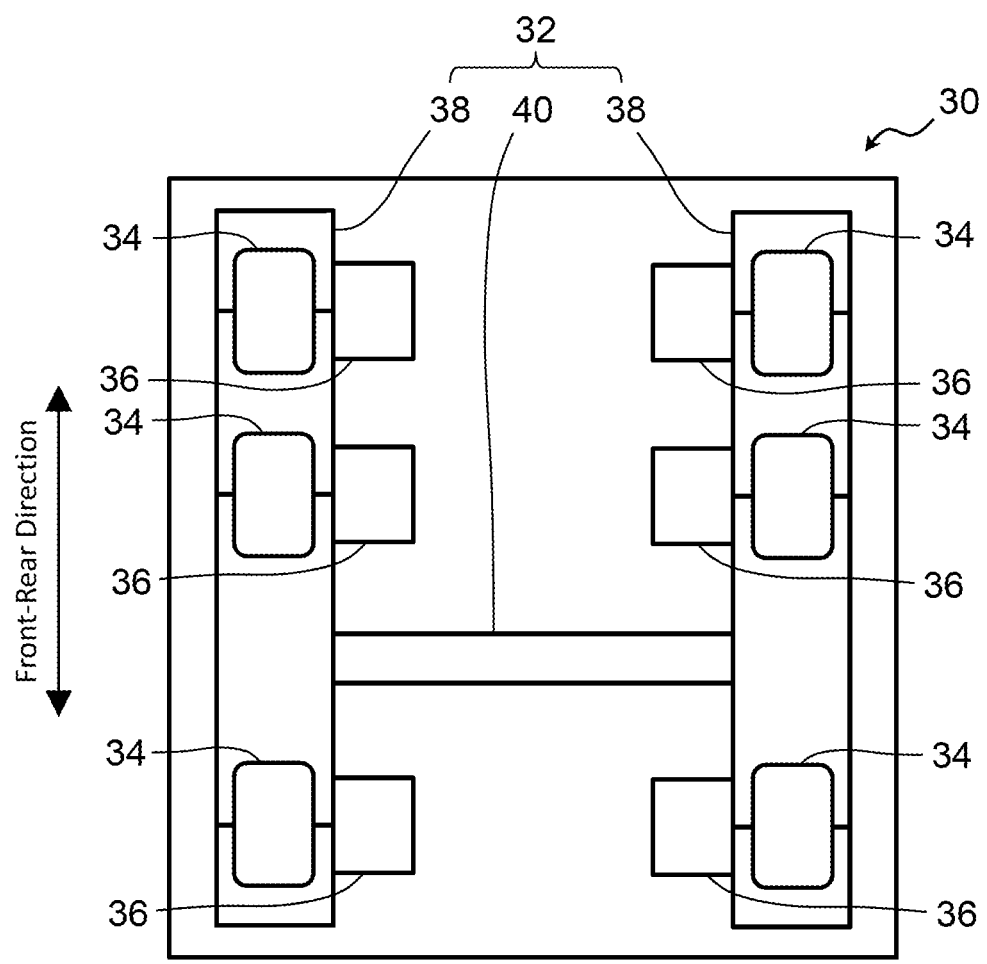
FIG. 4 is a bottom view showing an example configuration of a chassis unit of the stand-up vehicle shown in FIG. 1.

FIG. 4 is additionally referred to along with FIGS. 1 to 3. FIG. 4 is an example of the chassis unit 30 illustrated in FIG. 1. The chassis unit 30 includes a frame 32, wheels 34, and electric motors 36. As an example, six wheels 34 are provided. More specifically, three wheels 34 are disposed on each of the left and right sides of the vehicle 10 in a bilaterally symmetrical manner. The electric motors 36 are provided, for example, coaxially with each of the six wheels 34.

The number of the wheels 34 is arbitrarily determined in accordance with requirements such as the riding capacity of the vehicle 10 and the required driving force. Instead of six, for example, a total of four wheels, i.e., two wheels on the left and two wheels on the right, may be used. Further, the number of the electric motors 36 does not necessarily have to be the same as the number of the wheels 34, and may be changed according to requirements such as a required driving force. The electric motor 36 is an example of a "power unit" for driving the vehicle 10, and another example of the power unit is an internal combustion engine.

FIG. 4 shows a schematic shape of the frame 32. The frame 32 includes a main member 38 extending in the front-rear direction of the vehicle 10 on each of the left and right sides of the vehicle 10, and a sub-member 40 connecting the two main members 38. Three left wheels 34 and three electric motors 36 for driving them are fixed to the main member 38 on the left side of the vehicle 10. Similarly, three right wheels 34 and three electric motors 36 for driving them are fixed to the main member 38 on the right side of the vehicle 10.

Acceleration and deceleration of the vehicle 10 are performed by controlling the electric motor 36. Further, the vehicle 10 can be braked, for example, by using a regenerative brake realized by the control of the electric motor 36. The vehicle 10 may be provided with a mechanical brake on any wheel 34 for braking.

In addition, according to the vehicle 10 including the above-described chassis unit 30, by providing a difference between the rotational speeds of the three wheels 34 on the left side and the rotational speeds of the three wheels 34 on the right side, the vehicle 10 can be turned to the left and right. In the example shown in FIG. 4, each wheel 34 is a wheel having a general structure in which a tire is incorporated. Instead of such an example, in order to increase the degree of freedom of turning of the vehicle 10, for example, the four wheels 34 positioned at both ends in the front-rear direction may be replaced with wheels for omnidirectional movement (so-called omni wheels). Alternatively, a steering mechanism may be used to turn the vehicle 10.

In addition, although the vehicle 10 of the first embodiment is a wheeled vehicle including the wheels 34, the vehicle 10 according to the present disclosure is not limited thereto, and may be configured as a tracked vehicle having an infinite track.

The vehicle 10 is provided with a load sensor (weight sensor) 42 for the purpose of detecting whether a user has boarded the vehicle 10. The load sensor 42 is installed on the chassis unit 30 to detect a load acting on the top plate 14 using the riding surface 12 of the top plate 14 as a detection surface (see FIG. 2). The load sensor 42 is connected to an autonomous travel ECU 64, which will be described later, and is also used in "emergency upper limit speed management", which will be described later.

Figure 5:
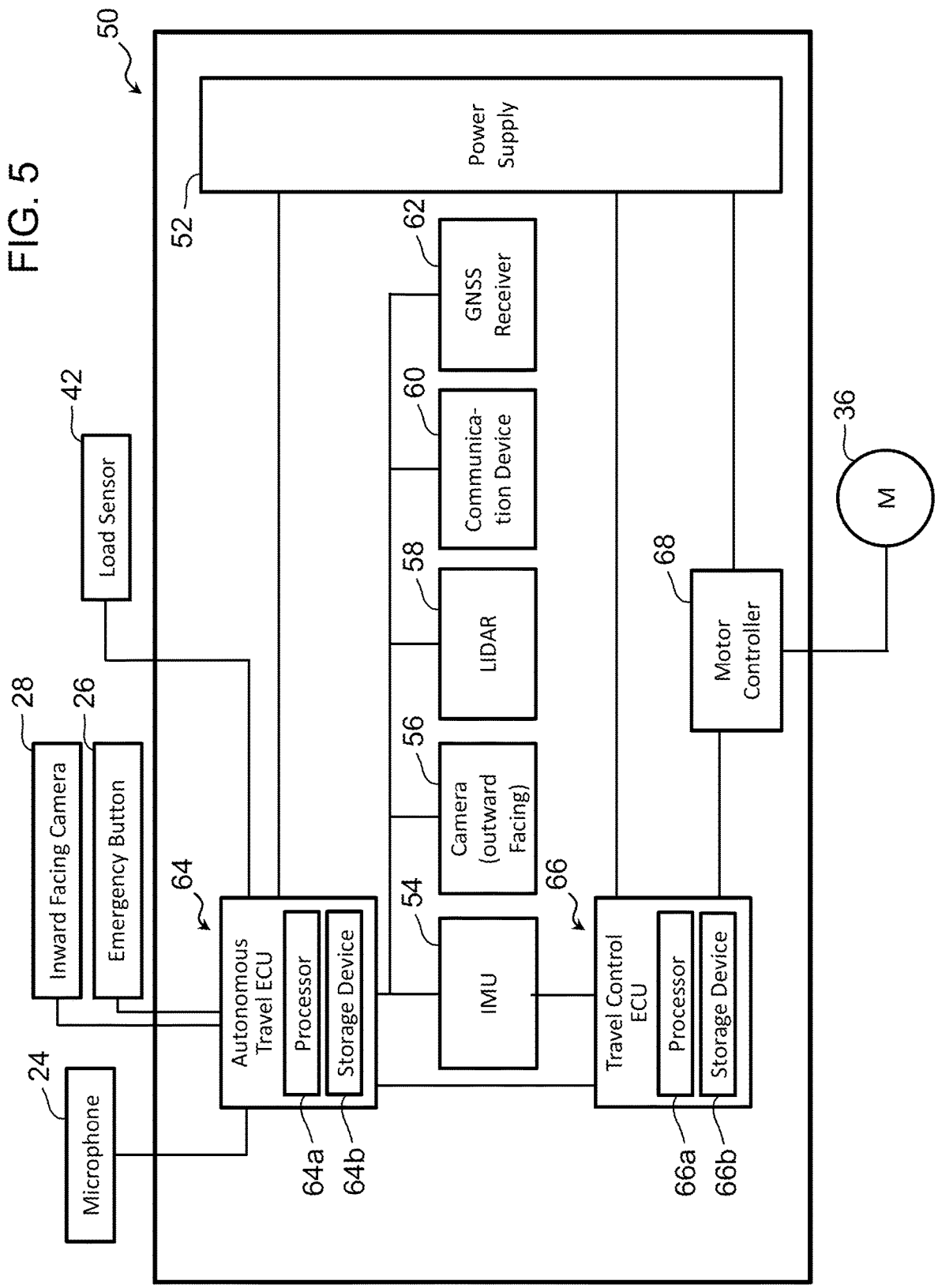
FIG. 5 is a block diagram schematically showing an example of a configuration of a control system mounted on the stand-up vehicle shown in FIG. 1.

FIG. 5 is a block diagram schematically showing an example of the configuration of a control system 50 for controlling the travel of the vehicle 10 shown in FIG. 1. The control system 50 is mounted on the vehicle 10. The control system 50 is configured to cause the vehicle 10 to autonomously travel.

As shown in FIG. 5, the control system 50 includes a power supply 52, an inertial measurement unit (IMU) 54, a camera 56, a laser imaging detection and ranging (LIDAR) 58, a communication device 60, a global navigation satellite system (GNSS) receiver 62, an autonomous travel ECU 64, a travel control ECU 66, and a motor controller 68. As shown in FIG. 1, the camera 56 is installed on each of the four supports 16, and the LIDAR 58 is installed on the back surface of each of the two backrests 18. As shown in FIG. 2, the components 52, 54, 60 to 68 of the control system 50 other than the camera 56 and the LIDAR 58 are disposed between the frame 32 and the top plate 14.

In some embodiments, the power supply 52 is a battery that is externally charged. The power supply 52 supplies electric power to each device (the electric motor 36 and the control system 50) mounted on the vehicle 10. The power supply 52 supplies electric power to the emergency button 26, the inward facing camera 28, and the load sensor 42 via the autonomous travel ECU 64. IMU 54 detects angular velocities and accelerations of three axes. Therefore, according to IMU 54, various traveling states such as the speed (vehicle speed), accelerations, and postures of the vehicle 10 can be acquired. The IMU 54 transmits the acquired traveling state to the autonomous travel ECU 64 and the travel control ECU 66.

The camera 56 and the LIDAR 58 are examples of an "external sensor" for recognizing the surrounding environment of the vehicle 10. The four cameras (outward facing cameras) 56 photograph the surroundings of the vehicle 10 (more specifically, the front right, front left, rear right, and rear left of the vehicle 10). The two LIDARS 58 respectively detect objects in front of and behind the vehicle 10. According to the LIDAR 58, the distance and the direction of the detected object from the vehicle 10 can be acquired. The camera 56 and the LIDAR 58 transmit the acquired information to the autonomous travel ECU 64. Instead of the example shown in FIG. 5, only one of the camera 56 and the LIDAR 58 may be used.

The communication device 60 performs communication (transmission and reception) with a communication device 72c of a management server 72 (see FIG. 6) to be described later via a wireless communication network such as 4G or 5G. The communication device 60 communicates with a mobile terminal 3 (see FIG. 6), which will be described later, via a similar wireless communication network. The GNSS receiver 62 acquires the position and orientation of the vehicle 10 based on signals from GNSS satellites. The GNSS receiver 62 transmits the acquired information to the autonomous travel ECU 64.

The autonomous travel ECU 64 includes a processor 64a and a storage device 64b. The storage device 64b stores at least one program for causing the vehicle 10 to autonomously travel. The processor 64a reads and executes the program stored in the storage device 64b, various processes by the processor 64a are realized. The storage device 64b stores map information as a map database. Alternatively, the processor 64a may acquire the map information from a map database stored in the storage device 72b (see FIG. 6) of the management server 72.

In an example of a use of the vehicle 10 (an example of using a vehicle dispatch service described later), the destination is transmitted from the mobile terminals 3 of the users to the autonomous travel ECU 64 via the management server 72. The autonomous travel ECU 64 (processor 64a) sets a target travel route from the current position of the vehicle 10 to the destination and a target vehicle speed (target speed of the vehicle 10) based on the position information of the vehicle 10 from the GNSS receiver 62 and the map information of the map database. In addition, the processor 64a changes (updates) the set target travel route and the set target vehicle speed as necessary on the basis of the travel state information and the position information of the vehicle 10 based on the IMU 54 and the GNSS receiver 62 and the information of the object around the vehicle 10 acquired by the camera 56 and the LIDAR 58.

The autonomous travel ECU 64 transmits the latest target travel route and target vehicle speed to the travel control ECU 66. The travel control ECU 66 includes a processor 66a and a storage device 66b. The storage device 66b stores various kinds of information necessary for controlling each electric motor 36 for autonomous traveling of the vehicle 10. The processor 66a generates a control command value (a command value such as a rotation speed and a rotation direction) of each electric motor 36 for causing the vehicle 10 to travel so as to realize the target travel route and the target vehicle speed. The processor 66a uses the information indicating the traveling state acquired by IMU 54 to generate the control command value.

The travel control ECU 66 commands the generated control command value of each electric motor 36 to the motor controller 68. The motor controller 68 includes a drive circuit that controls electric power supplied from the power supply 52 to the electric motors 36, and is provided for each of the six electric motors 36. Each of the motor controllers 68 controls energization of each of the electric motors 36 in accordance with a control command value from the travel control ECU 66.

According to the control by the autonomous travel ECU 64 and the travel control ECU 66 described above, the vehicle 10 can autonomously travel toward the destination.

The autonomous travel ECU 64 has a speed limiter function of limiting the speed of the vehicle 10 to an upper limit speed Vmax or less. To be specific, the autonomous travel ECU 64 (processor 64a) executes a program stored in the storage device 64b to limit the target vehicle speed so as not to exceed the upper limit speed Vmax. The travel control ECU 66 controls the electric motor 36 (power unit) so as to realize the target vehicle speed thus limited. Therefore, in the example of the control system 50 illustrated in FIG. 5, the autonomous travel ECU 64 and the travel control ECU 66 correspond to an example of "one or a plurality of electronic control units that control the power unit" according to the present disclosure. The upper limit speed Vmax is changed by an "upper limit speed management process" described later.

1-2. Configuration Example of Operation Management System

Figure 6:
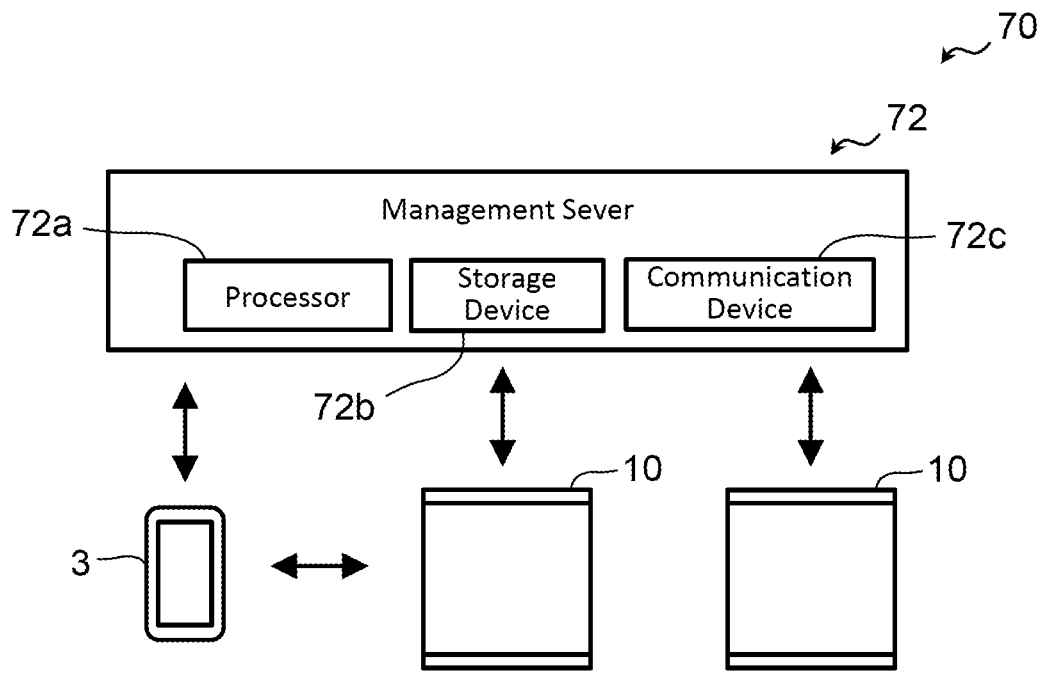
FIG. 6 is a block diagram schematically showing a configuration of an operation management system according to the first embodiment.

FIG. 6 is a block diagram schematically showing the configuration of the operation management system 70 according to the first embodiment. The vehicle 10 configured as described above can be used in various applications for moving people. One of the applications of such a vehicle 10 is a moving service for moving the user by performing autonomous traveling on a road on which a plurality of operation-managed vehicles 10 are planned to coexist with pedestrians. An example of a typical mobile service is a transportation service that brings a user to a desired destination.

The above-mentioned mobile service becomes more convenient by being provided with a vehicle allocation service that allocates the vehicle 10 in response to a request from the user. In order to realize a mobile service involving vehicle dispatch, the operation management system 70 includes at least one vehicle 10 (typically, a plurality of vehicles 10 as illustrated in FIG. 6), a mobile terminal 3, and a management server 72. The mobile terminal 3 is carried by the user of the vehicle 10 and is, for example, a smartphone or a tablet personal computer. The mobile terminal 3 includes a processor, a storage device, and a communication device.

The management server 72 includes a processor 72a, a storage device 72b, and a communication device 72c. The storage device 72b stores at least one program for mobile services including vehicle dispatch. The processor 72a reads and executes a program stored in the storage device 72b. Accordingly, various functions for providing a moving service including vehicle dispatch are realized. For example, the management server 72 (communication device 72c) communicates with the communication device 60 of each vehicle 10 and the mobile terminal 3 via a wireless communication network. The management server 72 manages user information. Further, the management server 72 performs operation management of the plurality of vehicles 10 including the vehicle dispatch service. The operation management of the plurality of vehicles 10 by the management server 72 may include, for example, a remote operation of the vehicle 10 in an emergency by an operator via the management server 72.

In addition, the mobile service with vehicle dispatch may be provided with a ride-sharing service. The mobile service may be provided without the vehicle dispatch service. Specifically, for example, a user who desires to ride approaches the vehicle 10 traveling around the user. As a result, the vehicle 10 detects this user and stops. The user uses the mobile terminal 3 to perform a predetermined boarding process and then boards the vehicle 10. Alternatively, the mobile service may be provided without using the management server 72 by using a boarding method in which the user visits a predetermined stop and boards the vehicle 10 waiting there. Further, the movement service is not limited to the example in which the vehicle 10 autonomously travels toward the destination set by the user. For example, the movement service may be a service in which the vehicle 10 circles while autonomously traveling on a predetermined route.

1-3. Emergency Upper Speed Limit Management

In the autonomous travel ECU 64, the speed (vehicle speed) of the vehicle 10 is limited to be equal to or less than the upper limit speed Vmax by the above-described speed limiter function. The value of the upper limit speed Vmax is determined in consideration of the safety of the user during traveling. In some embodiments, in a normal state (non-emergency), the "basic upper limit speed Vmaxb (for example, 6 km/h)" is used as the upper limit speed Vmax.

On the other hand, while the user is in the vehicle 10, there is a possibility that an emergency situation such as a bad physical condition of the user or a crime may occur. In such an emergency situation, it is conceivable to increase or cancel the upper limit speed Vmax from the basic upper limit speed Vmaxb. However, such increase or cancelation of the upper limit speed Vmax is required to be performed while ensuring the safety of the user.

In view of the above-described problem, in the present disclosure, the autonomous travel ECU 64 is configured to execute the emergency upper speed limit management which includes the following "emergency detection process", "safety posture determination process", and "upper limit speed management process". To be specific, the autonomous travel ECU 64 sets the upper limit speed Vmax to be higher than the basic upper limit speed Vmaxb in a case where the emergency situation of the users is detected by the emergency situation detection processing and it is determined that the users take a safety posture described later. That is, the upper limit speed Vmax is increase. At least one of these processes may be performed by, for example, a dedicated ECU instead of the autonomous travel ECU 64. An example of canceling the upper limit speed Vmax will be described later.

Note that, as a premise for performing such emergency upper limit speed management, the user is notified in advance that the vehicle 10 has a function of increasing or canceling the upper limit speed Vmax by, for example, the following method. That is, in the example of the vehicle dispatch service, the user receives an explanation of the function of increasing or canceling the upper limit speed Vmax on the screen displayed on the mobile terminal 3 at the time of reservation of the vehicle 10. In addition, this notification may be performed by an announcement using a speaker (not shown) installed on the vehicle 10 when the user gets on the vehicle or when an emergency situation described later is detected. Alternatively, the notification may be performed by using a display (not shown) provided on the handrail 22 or the table 20, or a warning label attached thereto.

1-3-1. Emergency Detection Processing

The emergency detection process is a process for detecting an emergency situation of the user who is on the vehicle 10. Specifically, for example, the user operates an HMI (Human Machine Interface) such as an emergency button 26 (see FIG. 1) in order to notify the vehicle 10 of an emergency situation such as a poor physical condition or crime occurrence of the user or another user. The autonomous travel ECU 64 detects the emergency when receiving the notification from the users by the operation.

In addition, the "notification of the user" for notifying the vehicle 10 of the emergency situation includes a case where the user utters a "predetermined password". The autonomous travel ECU 64 may also detect an emergency when such a password is detected by the microphone 24 (see FIG. 2). The password is for example "help" or "SOS". The notification of the available password to the user can be performed by the same method as the above-described notification method of the upper limit speed Vmax increase or cancelation function.

Further, the autonomous travel ECU 64 may detect an emergency situation based on information from one or more sensors instead of or in addition to the above-described notification from the users. The one or more sensors mentioned here are for detecting the movement of the user riding on the vehicle 10, and are, for example, inward facing camera 28 (see FIG. 1) and the load sensor 42 (see FIG. 2).

To be specific, the autonomous travel ECU 64 may detect the emergency situation by using the images of the users in the riding space captured by the inward facing camera 28. The autonomous travel ECU 64 detects (estimates) an emergency situation, for example, when it recognizes from the image of the inward facing camera 28 that the user is unable to stand and sits on the riding surface 12. In addition, when the load sensor 42 detects an abnormal change in load (i.e., abnormal vibration) on the riding surface 12, there is a possibility that some danger is posed to the user on the vehicle 10. Therefore, the autonomous travel ECU 64 may detect (estimate) an emergency when such abnormal vibration is detected by the load sensor 42.

1-3-2. Safety Posture Determination Processing

The safety posture determination process is a process of determining whether or not the user is in a safety posture based on information from one or more sensors that detect the movement of the user on the vehicle 10 after the detection of the emergency by the emergency detection process.

Figure 7:
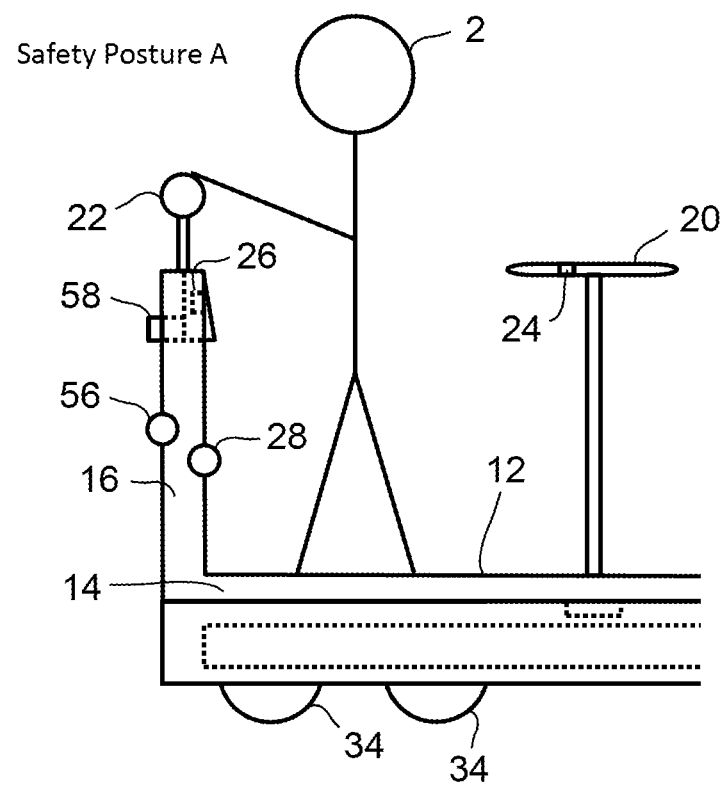
FIG. 7 is a partial side view of the stand-up vehicle showing a first posture (safety posture A) in which a user holds a handrail while standing on a riding surface.
Figure 8:
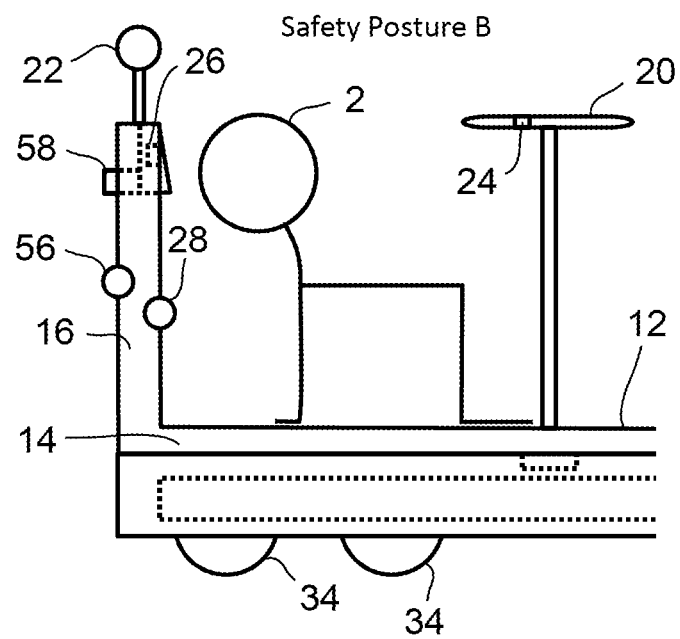
FIG. 8 is a partial side view of the stand-up vehicle showing a second posture (safety posture B) in which the user stands on all fours on the riding surface.
Figure 9:
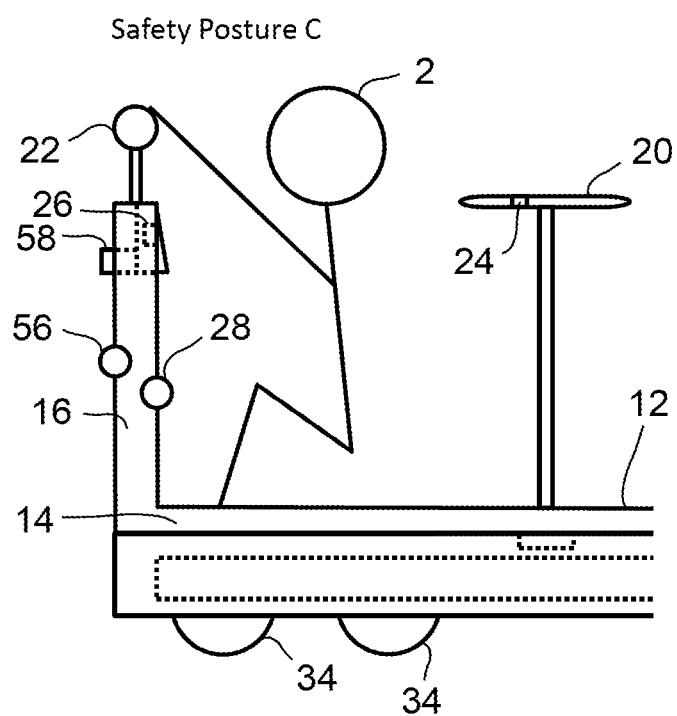
FIG. 9 is a partial view of the stand-up vehicle showing a third posture (safety posture C) in which the user squats on the riding surface while gripping the handrail.

FIGS. 7 to 9 are diagrams illustrating three specific types of safety postures A to C recognized as safety postures by the autonomous travel ECU 64 in the present disclosure. That is, in the safety posture determination process of the present disclosure, the autonomous travel ECU 64 determines whether or not the users are in any one of the safety postures A to C.

Specifically, FIG. 7 shows a first posture (safety posture A) in which the user 2 holds the handrail 22 while standing on the riding surface 12. FIG. 8 shows a second posture (safety posture B) in which the user 2 is or stands on all fours on the riding surface 12. FIG. 9 shows a third posture (safety posture C) in which the user 2 squats on the riding surface 12 while gripping the handrail 22. The safety posture to be determined by the safety posture determination process may be at least one of the safety postures A to C, or may include another safety posture together with at least one of the safety postures A to C.

An example of the "one or more sensors" used in the safety posture determination process is also the inward facing camera 28. That is, the autonomous travel ECU 64 determines whether or not the users are in any of the safety postures A to C using the images of the users captured by the inward facing camera 28. In the example configuration of the vehicle 10 illustrated in FIG. 1, since the inward facing camera 28 is installed on each of the supports 16, the autonomous travel ECU 64 can determine whether or not each of a maximum of four users takes any of the safety postures A to C.

In addition, the "one or more sensors" used in the safety posture determination process may be, for example, a human sensor (not illustrated) installed in at least one of the handrail 22 and another place (for example, the riding surface 12, the support 16, or the table 20) instead of the inward facing camera 28. Specifically, for example, it is possible to detect (estimate) that the user grips the handrail 22 by using a human sensor (for example, an infrared sensor) installed on the handrail 22. In addition, for example, it is possible to detect (estimate) that the user is in a squatting posture while gripping the handrail 22 by using a human sensor (for example, an infrared sensor) installed on the support 16 for detecting the posture of the user together with the human sensor installed on the handrail 22.

1-3-3. Upper Limit Speed Management Processing (Increase of Upper Limit Speed Vmax)

The upper limit speed management process is executed when an emergency is detected by the emergency detection process and it is determined that the user is in the safety posture A, B, or C by the safety posture determination process. In the upper limit speed management process, the autonomous travel ECU 64 sets the upper limit speed Vmax higher than the basic upper limit speed Vmaxb selected when it is determined that none of the safety postures A to C is taken.

Figure 10:
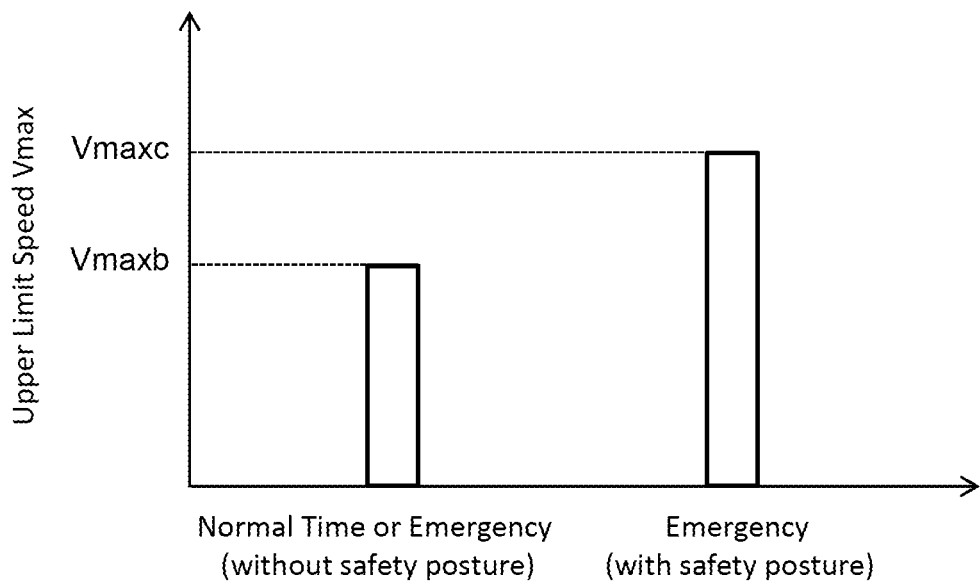
FIG. 10 is a graph for explaining an upper limit speed Vmax changed by an upper limit speed management process according to the first embodiment.

FIG. 10 is a graph for explaining the upper limit speed Vmax changed by the upper limit speed management process according to the first embodiment. The normal time shown in FIG. 10 means a time when an emergency is not detected by the emergency detection process, and the emergency means a time when an emergency is detected by the emergency detection processing. In the upper limit speed management process, as shown in FIG. 10, the basic upper limit speed Vmaxb is selected as the upper limit speed Vmax in the normal time. Further, even in the emergency, when it is determined by the safety posture determination process that the user does not take any of the safety postures A to C, the basic upper limit speed Vmaxb is selected as the upper limit speed Vmax.

On the other hand, in an emergency, when it is determined that the user is in the safety posture A, B, or C by the safety posture determination process, the corrected upper limit speed Vmaxc is selected as the upper limit speed Vmax by the upper limit speed management process. The corrected upper limit speed Vmaxc is, for example, a value obtained by adding a predetermined increase amount VA (for example, 4 km/h) to the basic upper limit speed Vmaxb.

The basic upper limit speed Vmaxb and the corrected upper limit speed Vmaxc are set in advance and stored in the storage device 64b of the autonomous travel ECU 64.

In addition, after the increase of the upper limit speed Vmax by the upper limit speed management process is started, the autonomous travel ECU 64 may continue traveling to the destination selected before the increase. Alternatively, the autonomous travel ECU 64 may change the destination to move emergency users to a safe location. To be specific, the autonomous travel ECU 64 selects safe places such as shops, hospitals, and police around the vehicle 10 by using the map information stored in the storage device 64b or the storage device 72b of the management server 72. Then, the autonomous travel ECU 64 sets the selected safe place as a new destination. In order to appropriately select an appropriate place according to the content of the emergency, the vehicle 10 may separately include, for example, an emergency button operated by the user when the physical condition is poor and an emergency button operated by the user when a crime occurs.

1-3-4. Flow of Processing in Upper Limit Speed Management

Figure 11:
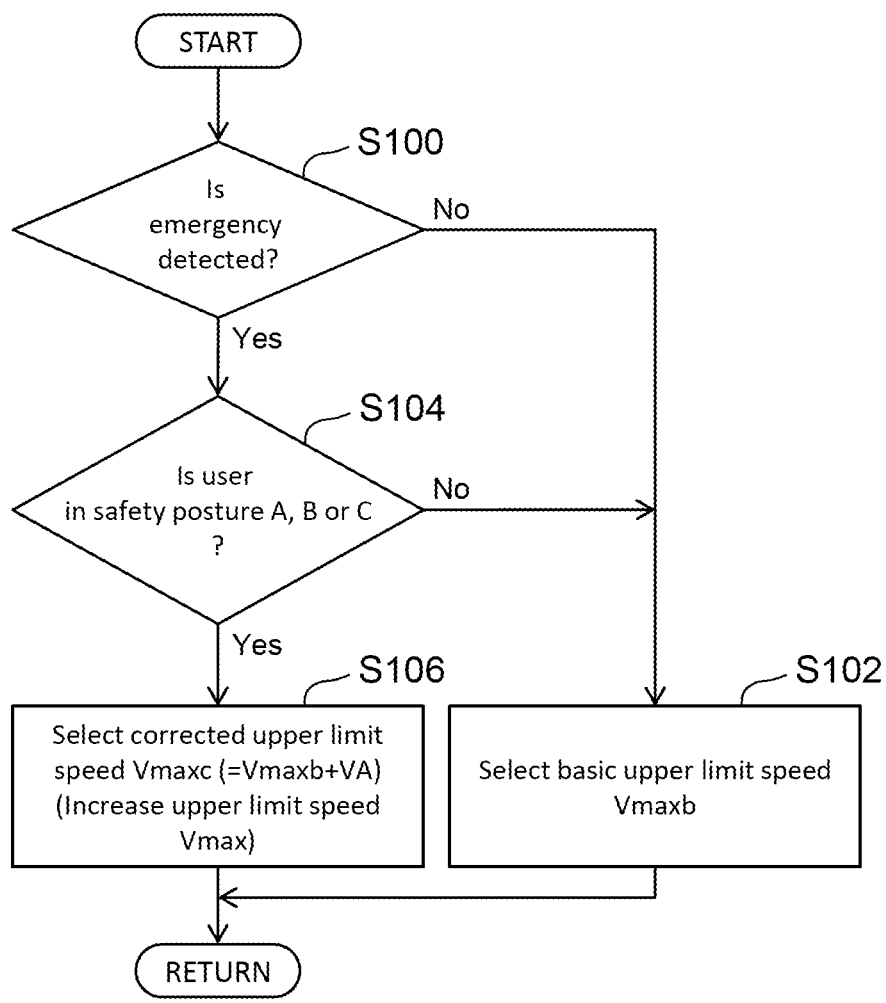
FIG. 11 is a flowchart showing an example of a process in an emergency upper limit speed management according to the first embodiment.

FIG. 11 is a flowchart illustrating an example of processing in upper-limit speed management in an emergency according to the first embodiment. The processing of this flowchart is repeatedly executed while the vehicle 10 is traveling (while the movement service is being provided).

In FIG. 11, in step S100, the autonomous travel ECU 64 (processor 64a) executes the above-described emergency state detection process. As a result, when the emergency state is not detected, the process proceeds to step S102. In step S102, the autonomous travel ECU 64 selects the basic upper limit speed Vmaxb as the upper limit speed Vmax.

On the other hand, when an emergency state is detected in step S100 (that is, in an emergency), the process proceeds to step S104. In step S104, the autonomous travel ECU 64 executes the safety posture determination process described above. As a result, when the users are not in any of the safety postures A to C, the process proceeds to step S102. That is, the basic upper limit speed Vmaxb is selected even when the emergency state is detected. In the safety posture determination process, when a plurality of users are in the vehicle 10, it is determined whether all of the plurality of users are in the safety posture A, B, or C.

When the user is in the safety posture A, B or C in step S104, the process proceeds to step S106. In step S106, the autonomous travel ECU 64 selects the corrected upper limit speed Vmaxc, which is higher than the basic upper limit speed Vmaxb by the predetermined increase amount VA, as the upper limit speed Vmax. Here, the predetermined increase amount VA is a fixed value as an example.

In addition, according to the flowchart illustrated in FIG. 11, after the corrected upper limit speed Vmaxc is set in step S106, the process repeats, and when the users no longer is in the safety postures A to C (step S104: No), the process proceeds to step S102. That is, the increase of the upper limit speed Vmax is stopped (the basic upper limit speed Vmaxb is selected again).

1-4. Effect

As described above, according to the emergency upper limit speed management of the present embodiment, the upper limit speed Vmax is set higher than the basic upper limit speed Vmaxb when an emergency situation is detected and it is determined that the user is in the safety posture A, B, or C compared to the upper limit speed Vmax when an emergency situation is not detected or when an emergency situation is detected and it is determined that the user is not in the safety posture A, B, or C. In this way, the increase of the upper limit speed Vmax by the upper limit speed management of the present disclosed is performed not only in response to the detection of the emergency situation but also on the additional condition that the user is in the safety posture A, B, or C. Therefore, it is possible to provide the vehicle 10 capable of increasing the upper limit speed Vmax while securing the safety of the user in an emergency. In addition, the increase of the upper limit speed Vmax can be utilized to quickly move the user to a safe place while sufficiently securing the safety of the user in the vehicle even in an emergency.

In addition, according to the emergency upper limit speed management according to the present disclosure, the user can use a password as one of way for notifying the vehicle 10 of an emergency situation. When a physical condition of the user is suddenly changed, or when some danger is felt by the user, it may be difficult for the user to operate a device such as the emergency button 26 installed at a predetermined position of the vehicle 10. In this regard, the use of the password allows the user to quickly notify the vehicle 10 of the occurrence of the emergency situation without the need to operate a predetermined device.

Further, according to the emergency upper limit speed management according to the present disclosure, the safety posture to be determined by the safety posture determination process includes the safety posture B (the posture of standing on all fours) and the safety posture C (the posture of squatting while gripping the handrail 22). The safety postures B and C are safer than the safety posture A (the posture of holding the handrail 22 while standing) because a center of gravity of the user is lowered. By including such safety postures B and C as a determination target of the safety posture determination process, it is possible to increase the upper limit speed Vmax in an emergency situation while more sufficiently considering safety. In addition, the determination target of the safety posture determination process may be only two of the safety postures B and C or only either one of the safety postures B and C.

1-5. Another Example of the Upper Limit Speed Management Process (Cancellation of the Upper Limit Speed Vmax)

Figure 12:
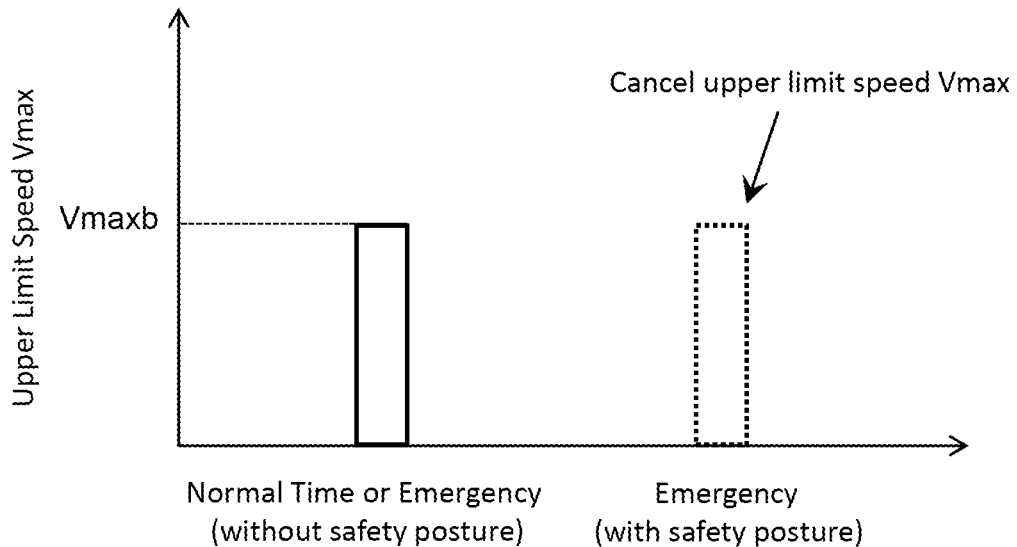
FIG. 12 is a graph for explaining a modified example of the upper limit speed management process according to the first embodiment.

FIG. 12 is a graph for explaining a modified example of the upper limit speed management process according to the first embodiment. In the example illustrated in FIG. 10 described above, the autonomous travel ECU 64 sets the upper limit speed Vmax to be higher than the basic upper limit speed Vmaxb when the emergency situation is detected and it is determined that the users are in the safety posture A, B, or C. On the other hand, in the example illustrated in FIG. 12, the autonomous travel ECU 64 cancels the upper limit speed Vmax in a case where the emergency situation is detected and it is determined that the users take the safety posture A, B, or C. As a result, the vehicle 10 can run at the highest possible speed.

Figure 13:
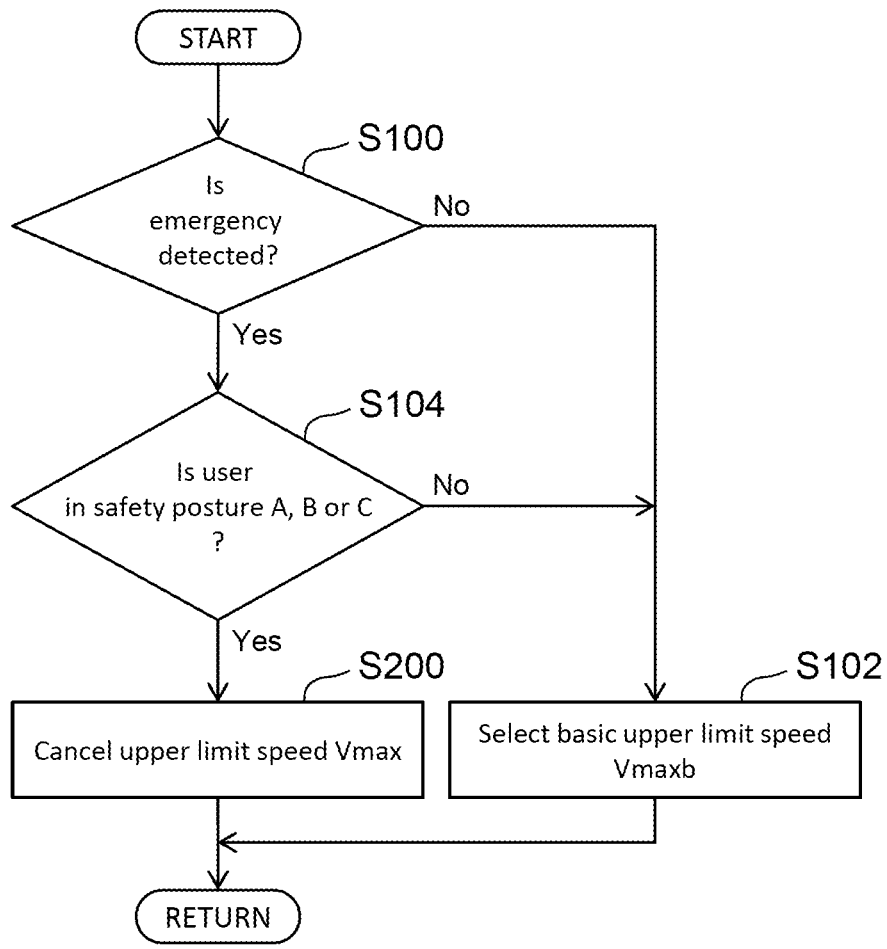
FIG. 13 is a flowchart showing a modified example of the process in the emergency upper limit speed management according to the first embodiment.

FIG. 13 is a flowchart illustrating the modified example of the process in the upper-limit speed management in an emergency according to the first embodiment. The flowchart shown in FIG. 13 is the same as the flowchart shown in FIG. 11 except that step S200 is used instead of step S106. That is, in FIG. 13, in a case where the user takes the safety posture A, B, or C in step S104, the autonomous travel ECU 64 (processor 64a) cancels the upper limit speed Vmax (step S200).

According to the example shown in FIG. 13, it is possible to provide the vehicle 10 capable of canceling the upper limit speed Vmax while securing the safety of the user in an emergency situation.

Figure 14:
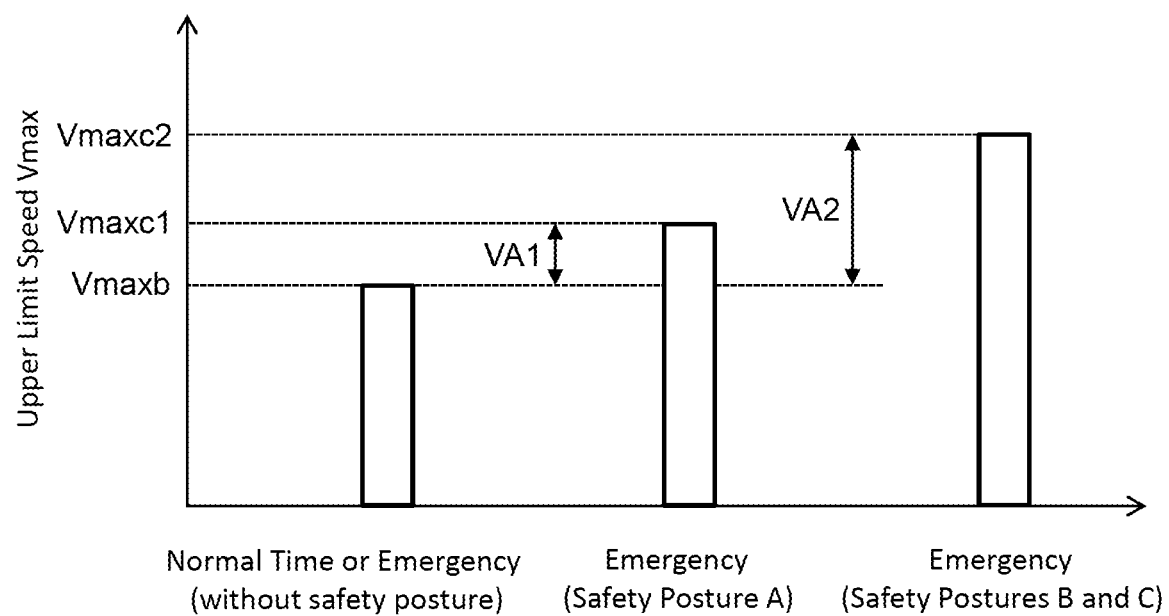
FIG. 14 is a graph for explaining still another modified example of the upper limit speed management process according to the first embodiment.

1-6. Other Setting Example of Predetermined Increase Amount VA of Upper Limit Speed Vmax FIG. 14 is a graph for explaining still another modified example of the upper limit speed management process according to the first embodiment. In step S106 (see FIG. 1) described above, the predetermined increase amount VA is a fixed value regardless of the safety postures A to C to be determined. In contrast, in the modified example illustrated in FIG. 14, the predetermined increase amount VA of the upper limit speed Vmax is changed in accordance with the safety postures A to C taken by the user.

Specifically, as described above, the safety posture B (the posture of standing on all fours) and the safety posture C (the posture in which the user squats while gripping the handrail 22) are safety postures because the center of gravity of the user is lowered, as compared with the safety posture A (the posture of gripping the handrail 22 while standing).

Therefore, in the example shown in FIG. 14, a predetermined increase amount VA2 used when the safety posture B or C is taken and a predetermined increase amount VA1 is used when the safety posture A is taken. The predetermined increase amount VA2 is set larger than the predetermined increase amount VA1. As a result, a corrected upper limit speed Vmaxc2 is used when the safety posture B or C is taken and a corrected upper limit speed Vmaxc1 is used when the safety posture A is taken. The corrected upper limit speed Vmaxc2 is larger than the corrected upper limit speed Vmaxc1. The safety postures A, B, and C correspond to examples of "first, second and third postures" according to the present disclosure, respectively.

Figure 15:
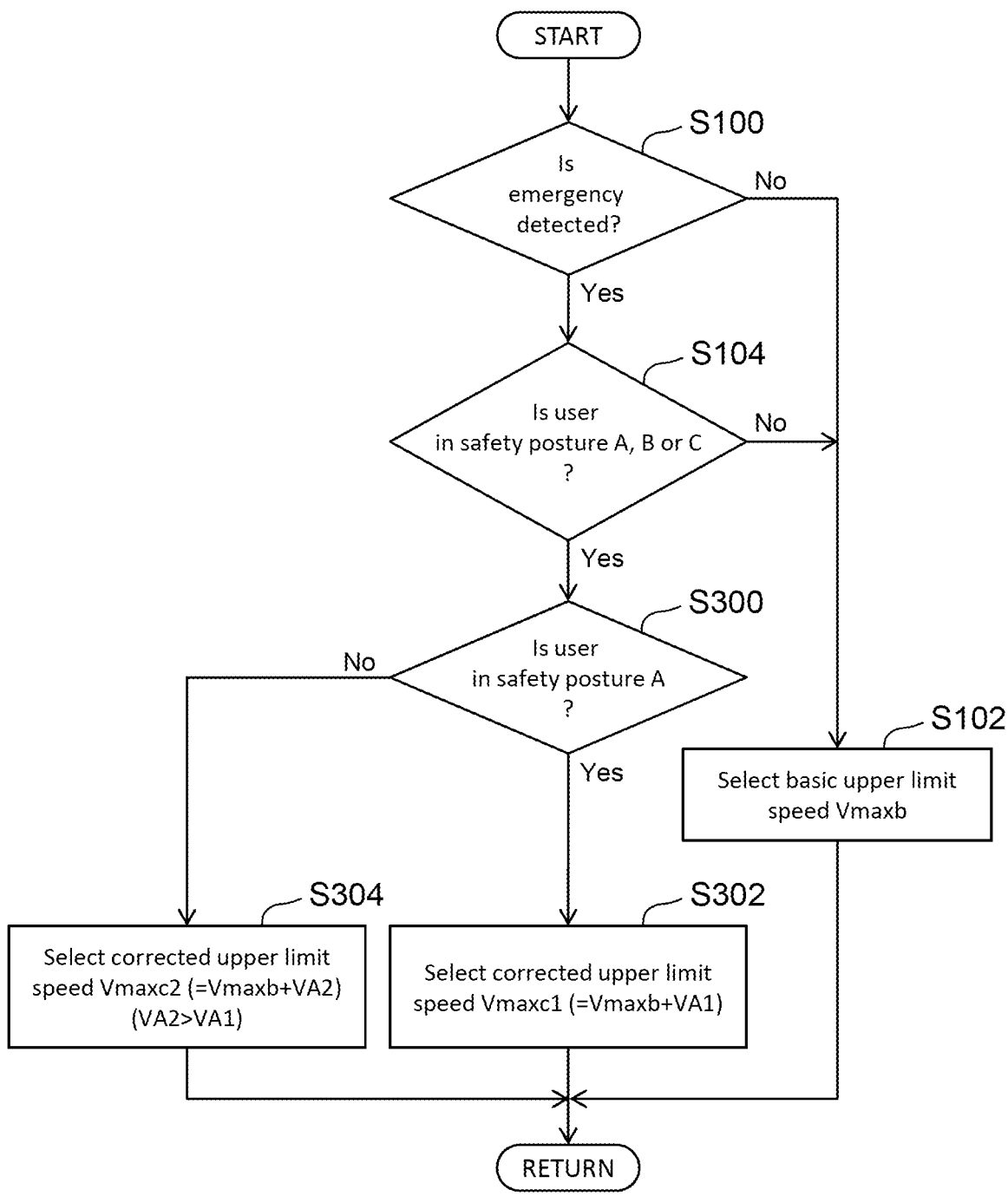
FIG. 15 is a flowchart showing still another modified example of the process in the emergency upper limit speed management according to the first embodiment.

FIG. 15 is a flowchart illustrating still another modified example of the process in the upper-limit speed management in an emergency according to the first embodiment. The processing of the flowchart shown in FIG. 15 is the same as the processing of the flowchart shown in FIG. 11 except for the following points.

In FIG. 15, when the user is in the safety posture A, B or C in step S104, the process proceeds to step S300. In step S300, the autonomous travel ECU 64 (the processor 64a) determines whether or not the posture taken by the user is the safety posture A.

When the user is in the safety posture A in step S300, the process proceeds to step S302. In step S302, the autonomous travel ECU 64 selects the corrected upper limit speed Vmaxc1 that is higher than the basic upper limit speed Vmaxb by the increase amount VA1.

On the other hand, when it is determined in step S300 that the user is not in the safety posture A (in other words, when the user is in the safety posture B or C), the process proceeds to step S304. In step S304, the autonomous travel ECU 64 selects the corrected upper limit speed Vmaxc2 that is higher than the basic upper limit speed Vmaxb by the increase amount VA2 (the predetermined increase amount VA2>the predetermined increase amount VA1).

According to the flowchart shown in FIG. 15, when the level of safety of the safety posture taken by the user is high (safety posture B or C), the upper limit speed Vmax is increased more compared to the when the level of safety of the safety posture taken by the user is low (safety posture A). Thus, a degree of increase of the upper limit speed Vmax can be set more appropriately in consideration of the level of safety of the safety posture.

In some embodiments, when the determination result of step S300 in FIG. 15 is negative (when the user takes the safety posture B or C), the process may proceed to step S200 (see FIG. 13) and the upper limit speed Vmax may be canceled. In addition, a difference in the upper limit speed Vmax may be provided between the safety posture B (the posture of standing on all fours) and the safety posture C (the posture of squatting while gripping the handrail 22). More specifically, the upper limit speed Vmax used when the safety posture B is taken may be set higher than the upper limit speed Vmax used when the safety posture C is taken, or vice versa.

2. Other Embodiments

In other embodiments according to the present disclosure, one or more electronic control units (for example, an autonomous travel ECU 64) may additionally execute at least one of the following "first to fourth additional processes" in the upper-limit speed management in an emergency described in first embodiment.

2-1. First Additional Processing

In the first additional processing, the autonomous travel ECU 64 notifies the outside of the vehicle 10 when the emergency situation of the users is detected in step S100. The notification here requests the rescue of the user outside the vehicle 10.

Specifically, for example, the autonomous travel ECU 64 notifies the management server 72 of a request for rescue by using the communication device 60 mounted on the vehicle 10. The notification by the first additional processing includes, for example, transmission of the current position information of the vehicle 10 acquired by using the GNSS receiver 62. In addition, in an example in which the storage device 64b stores the information necessary for communicating with stores, hospitals or police around the vehicle 10 or the reception desk of an ambulance, the autonomous travel ECU 64 may perform notification to any of the above by using the communication device 60. In addition, in an example in which the vehicle 10 includes a speaker, the autonomous travel ECU 64 may notify people around the vehicle 10 using the speaker. In addition, in order to appropriately select a notification destination, the vehicle 10 may separately include, for example, an emergency button that is operated when the physical condition is poor and an emergency button that is operated when a crime occurs.

By additionally using the above-described first additional processing, it is possible to provide a vehicle 10 that is able to cope with an emergency situation occurring to the user.

2-2. Second Additional Processing

In a representative example of an application of the vehicle 10, the vehicle 10 travels on a road (i.e., a road different from a road for automobiles) on which the vehicle 10 is planned to coexist with pedestrians at a lower speed than automobiles. In other words, the automobiles can move faster than the vehicle 10. The second addition process is executed, for example, for such a representative example.

To be more specific, the autonomous travel ECU 64 executes, as the second additional process, a process for delivering users with sudden physical condition problems to an automobile X such as an ambulance or a taxi. First, when an emergency situation is detected and it is determined that the users are in the safety posture A, B, or C, the autonomous travel ECU 64 executes a process of determining a meeting place with the automobile X to which the users are to be transferred and a process of calling the automobile X. The determination of the meeting place can be performed by using, for example, map information stored in the storage device 64b or the storage device 72b of the management server 72. The process of calling the automobile X including the notification of the meeting place can be performed using the communication device 60, for example. The determination of the meeting place and the calling of the automobile X may be performed by the management server 72 to which the information of the occurrence of the emergency is notified from the autonomous travel ECU 64. The autonomous travel ECU 64 quickly moves the vehicle 10 with the determined meeting place as a destination while increasing or canceling the upper limit speed Vmax.

By additionally using the above-described second additional processing, it is possible to move the user to a safe place more quickly by using the automobile X that can move at a higher speed while reducing the time until the user is delivered to the automobile X as much as possible by increasing or cancelling the upper limit speed Vmax.

2-3. Third Additional Processing

In a typical example of the use of the vehicle 10, in a normal state, the vehicle 10 autonomously travels along a target travel route set on a road on which the vehicle 10 is permitted (scheduled) to travel (for example, a road on which the vehicle 10 and a pedestrian coexist). The third addition process is executed, for example, for such a representative example.

To be specific, in the third additional processing, when the upper limit speed Vmax is increased or canceled in an emergency situation, the autonomous travel ECU 64 determines the target travel route including a road (for example, an automobile road) other than the above-described road used in the normal state. Accordingly, when the vehicle 10 moves the user in an emergency situation, it is possible to increase the degree of freedom in selecting a travel route. That is, in order to quickly move the user to a safe place, it is possible to select an efficient travel route (for example, a shortened travel route) that cannot be selected at normal times.

2-4. Fourth Additional Processing

The increase or cancellation of the upper limit speed Vmax by the above-described upper limit speed management processing can be basically executed regardless of the number of passengers. Then, the fourth addition process is a process of executing the upper limit speed management process when the number of passengers on the vehicle 10 is less than a predetermined threshold and not executing the upper limit speed management process when the number of passengers is equal to or greater than the threshold. The number of passengers can be counted by using, for example, the load sensor 42 (see FIG. 2) that detects a load acting on the riding surface 12.

When the number of passengers is large, there is a concern that the deceleration performance and the turning performance of the vehicle 10 may be deteriorated as compared with a case where the number of passengers is small. According to the fourth addition process, the upper limit speed Vmax is increased or canceled only when the number of passengers is less than the threshold. Therefore, it is possible to increase or cancel the upper limit speed Vmax while ensuring high safety of the vehicle 10 during traveling in terms of the vehicle weight.

What is claimed is:

1. A stand-up vehicle comprising:
   a vehicle upper portion having a surface configured for a user to stand on;
   a handrail arranged on the surface of the vehicle upper portion, the handrail configured for the user to grip;
   one or more sensors configured to detect movement of the user riding on the stand-up vehicle;
   a power unit configured to drive the stand-up vehicle; and
   one or more electronic control units configured to control the power unit to limit a speed of the stand-up vehicle to an upper limit speed or less, wherein
   the one or more electronic control units are configured to execute:
   an emergency detection process to detect an emergency of the user when receiving a notification from the user or based on information from the one or more sensors;
   a safety posture determination process to determine whether or not the user is in a safety posture based on information from the one or more sensors after the emergency is detected by the emergency detection process, the safety posture includes a posture in which the user stands on all fours on the surface including the user being only on their hands, knees, and feet;
   an upper limit speed management process that is executed when the emergency is detected by the emergency detection process and the user is determined by the safety posture determination process to be in the safety posture, and
   in the upper limit speed management process, the one or more electronic control units increase the upper limit speed to be higher than a basic upper limit speed selected when the safety posture determination process determines that the user is not in the safety posture, or cancels the upper limit speed.

2. The stand-up vehicle according to claim 1, further comprising a microphone, wherein
   the one or more electronic control units are configured to detect the emergency when a predetermined password corresponding to the notification from the user is detected by the microphone.

3. The stand-up vehicle according to claim 1, wherein the safety posture includes a posture in which the user squats on the surface while gripping the handrail.

4. The stand-up vehicle according to claim 1, wherein the safety posture includes a first posture in which the user holds the handrail while standing on the surface, and the posture in which the user stands on all fours on the surface, and
   in the upper limit speed management process, the one or more electronic control units increase an increase amount of the upper limit speed with respect to the basic upper limit speed when the safety posture determined by the safety posture determination process is the posture, as compared to an increase amount of the upper limit speed when the safety posture is the first posture.

5. The stand-up vehicle according to claim 1, wherein the safety posture includes a first posture in which the user holds the handrail while standing on the surface and a third posture in which the user squats on the surface while gripping the handrail, and
   in the upper limit speed management process, the one or more electronic control units increase an increase amount of the upper limit speed with respect to the basic upper limit speed when the safety posture determined by the safety posture determination process is the third posture, as compared to an increase amount of the upper limit speed when the safety posture is the first posture.

6. The stand-up vehicle according to claim 1, wherein the handrail includes a front handrail and a rear handrail, the front handrail extends between a pair of front supports that extend upwardly from the surface at a front end portion of the stand-up vehicle, and the rear handrail extends between a pair of rear supports that extend upwardly from the surface at a rear end portion of the stand-up vehicle.

7. The stand-up vehicle according to claim 6, further comprising an emergency button provided on each of the pair of front supports and the pair of rear supports, the emergency button operated by the user to notify the stand-up vehicle of an emergency situation.

8. The stand-up vehicle according to claim 6, wherein the one or more sensors includes an inward facing camera installed on at least one of the pair of front supports and the pair of rear supports.

9. The stand-up vehicle according to claim 1, wherein the one or more sensors includes a weight sensor that is configured to detect a change in load on the surface.

* * * * *